United States Patent Office 3,481,914
Patented Dec. 2, 1969

3,481,914
POLYMERIZATION PROCESS AND PRODUCTS
Howard V. Holler, Oakland, and Edward A. Youngman, Lafayette, Calif., assignors to Shell Oil Company, New York, N.Y., a corporation of Delaware
No Drawing. Filed May 14, 1965, Ser. No. 455,990
Int. Cl. C08f 15/02, 3/02
U.S. Cl. 260—91.7                                      6 Claims

ABSTRACT OF THE DISCLOSURE

Halogen-substituted terminal olefins having the halogen and olefin groups separated by at least the distance of two chain carbon atoms are converted by Ziegler catalysts to homopolymers, or to random or block-copolymers in which an alpha monoolefin is the comonomer.

---

This invention is directed to the addition polymerization of alpha-olefins which bear halogen substituents.

Stereoregular polymerization of terminally unsaturated olefinic hydrocarbons by means of Ziegler-type coordination catalysts has become a widely practiced commercial process, particularly in the production of polyethylene and polypropylene. Random copolymerization of terminally unsaturated olefinic hydrocarbons for production of rubbery linear copolymers is also practiced with Ziegler-type coordination catalysts.

Linear polyolefin hydrocarbons have numerous highly advantageous properties, but they are handicapped for some uses by their relative chemical inertness. This renders them hard to dye and can adversely affect other properties, such as adhesive properties and, in the case of rubbery polymers, their vulcanizability. Many methods for overcoming such deficiencies have been suggested but none have found universal acceptance.

This invention provides a means for producing stereoregular polymers of enhanced reactivity from alpha-olefins which bear halogen substituents. It also provides a method for producing linear polymers having a wide range and content of halogen substituents.

This invention is concerned with the polymerization of monomers which have a terminal ethylenic double bond, separated by at least two carbon atoms from a halogen-substituted carbon atom. Much preferred are those monomers in which the vinyl group and the halogen-substituted group are separated by several carbon atoms.

The prior art contains no generally useful method for the Ziegler-type polymerization of alpha-olefins bearing halogen substituents. There have been some academic studies of the Ziegler polymerization of styrene analogs bearing mono-, bromo-, chloro-, and fluoro-substituents, of alpha-olefins bearing trifluoromethyl groups, and of perfluoroolefins such as tetrafluoroethylene and perfluoropropylene, but these methods are generally difficult, result generally in very low yields, and are not practical, technically useful methods for the production of polymers of halogen-substituted olefins of the type described below.

It has now been found, in accordance with this invention, that certain olefinic halogen-containing compouds which have heretofore been regarded as unsuitable for use in stereoregular polymerization can be employed to produce stereoregular homopolymers, and random or block copolymers with terminally unsaturated olefinic hydrocarbons. Particularly advantageous are block copolymers containing large blocks of stereoregular hydrocarbon homopolymer and small blocks of polymer of halogen-substituted compounds.

This invention is based on systematic relationships discovered in a detailed study of the polymerization of a number of different nonhydrocarbon compounds by contact with Ziegler-type coordination catalysts under a variety of conditions. Among the pertinent findings upon which this invention is based are the following:

The facility or degree to which Ziegler-type coordination catalyst components react with halogenated compounds is highly dependent upon the structure of the latter. Halogenated compounds which yield relatively stable carbonium ions by the loss of halide ions donate halide ions to the cataylst components easily. Abstraction of halide ions by the catalyst components will deactivate or otherwise alter their mode of action, usually in an undesirable manner. The carbonium ions generated by halide ion abstraction can bring about olefin polymerization, often in a rapid, unstereospecific manner. When the latter occurs the advantages of stereo-regulation accrued through the use of the Ziegler-type catalysts are lost. The tendency of halogenated compounds to donate halide ions and yield carbonium ions with Ziegler-type coordination catalysts has been found to increase in the following order: Aromatic<primary<secondary<tertiary<benzylic or allylic. Polyhalo groups usually donate halide ions more readily than do monohalogen compounds.

The metal alkyl co-catalyst present in the Ziegler catalyst system also affects its ability to abstract halide ions. For exampe, when the co-catalyst is an aluminum trialkyl, the tendency for abstraction is less than when it is an aluminum alkyl halide.

Despite precautions in selection of the halogenated compound and metal alkyl, small amounts of carbonium ions may be generated in the polymerization media. Their ability to cause undesirable cationic polymerization can be inhibited by the addition of certain polar additives to react selectively with carbonium ions to deactivate them. Thus, these carbonium ions can no longer initiate the undesired cationic polymerization. A wide range of polar additives can be employed for this suppression. Ethers, sulfides and particularly amines are among those which are useful. These additives are effective at concentration levels or in amounts which are insufficient to prevent normal Ziegler-type coordination polymerization.

Often Ziegler-type polymerizations are run at temperatures greater than 60° C. Higher reaction temperatures promote to abstraction of halide ions from halogen compounds by Ziegler-type catalysts and hence are undesirable in the processes of this invention. Polymerization temperatures in the 0° to 60° C. range are preferred in the process of this invention.

For use in the process of this invention, the halogenated monomer should be one in which the terminal vinyl group and the halogen substituents are separated by at least two carbon atoms. The halogens should preferably be attached to primary or aromatic carbon atoms, but in certain instances attachment to secondary carbon atoms is acceptable. Attachment at tertiary, allylic or benzylic carbon atoms is undesirable. The halogenated monomer may bear one or several halogen atom substituents. In polyhalogenated monomers, it is preferable to have no gem-, di- or trihalo-substituents, except in the case where the halogen is fluorine.

It has also ben found that halogen substituents in the polymers resulting from this invention undergo many of the same reactions as do similarly constituted non-polymeric organic halides. Thus, polymers prepared according to this invention can be converted into a variety of derivatives not readily obtainable by direct polymerization.

UTILITY AND PROPERTIES OF POLYMERS WHICH CONTAIN HALOGEN-BEARING GROUPS

The homopolymers and copolymers produced according to this invention vary widely in physical and chemical properties, depending on the halogen-bearing monomer employed, the ratio of the latter to hydrocarbon monomer, and the relative arrangement of both types of units in the polymer chains.

One great area of utility of the products of this invention consists in providing readily controllable degrees of dyeability in polymers which are predominantly polymers of olefinic hydrocarbons. These polymers can be subjected to a wide variety of common organic reactions of halogen compounds such as quaternization with amines. Groups such as the latter are particularly valuable as dye sites.

The utility of crystalline stereoregular polyolefin hydrocarbons and of random copolymers of olefinic hydrocarbons have been well established and such compounds are in commercial use. Crystalline polyolefins are suitable for the production of numerous molded or extruded manufactured articles such as containers, packaging films, textile fibers, and the like, and random copolymers for use as rubbers, such as in tires. Block copolymers containing small blocks of a polymer of halogen-substituted olefins attached to hydrocarbon polyolefins are not significantly changed in physical properties from the corresponding hydrocarbon polymer and are therefore useful for all the same uses, in addition to having the characteristic of being dyeable or otherwise reactive by virtue of the presence of the substituents.

The random incorporation of halogen-bearing olefins into rubbery hydrocarbon copolymers according to this invention provides a novel and improved method of cross-linking and vulcanization.

Homopolymers of halogen-substituted olefins according to this invention or copolymers having a high concentration of such olefin are particularly suitable as blending stocks for blending into other polymers such as, for example, stereoregular crystalline polyolefins, to introduce dyeability of other desirable reactivity.

The presence of halogen in these polymers, particularly bromine, is valuable in improving the fire-retardant character of fabricated items. Fire-retardant phosphorus-containing groups can also be incorporated into these polymers by well-known reactions of halogen groups, such as the Arbuso reaction.

It has been found that some of the polymers of this invention may be useful in lubricating oil compositions, where they provide dispersancy and inhibitor properties and aid in lubricating at extreme pressures.

The physical properties of polymers produced according to this invention vary, depending on the halogen compound employed, the proportion thereof in the total polymer, and the method of preparation of the polymer, i.e., whether it is prepared by homopolymerization, random copolymerization or block copolymerization. The polymers may be oily liquids, glassy solids, rubbery solids or highly crystalline polymers which are similar in properties to polypropylene.

Random copolymers in which a halogen compound is introduced together with olefinic hydrocarbons vary in properties from (1) essentially crystalline, when the feed consists of only a small amount of polar compound and a single olefin which forms crystalline polymer, to (2) rubbery copolymers, to (3) polymers having essentially the properties of homopolymers of the halogen-substituted olefins, when only a small amount of the hydrocarbon olefin is present. The random copolymers in which the halogen compound is present in small concentration are essentially like the corresponding hydrocarbon polymers except for the added beneficial properties of dyeability or other reactability.

MONOMERS

Hydrocarbons

Monoolefins suitable for use in copolymers according to this invention are any terminal monoolefin hydrocarbons which are otherwise employed in Ziegler-type polymerization. Broadly, any terminally unsaturated monoolefin hydrocarbon of from 2 to 30 carbon atoms per molecule is suitable. Higher olefins, e.g., of up to 50 or more carbon atoms per molecule, may sometimes be useful.

Particularly suitable for many uses is propylene. Others which result in linear or stereoregular polymers are ethylene, 1-butene, 1-hexene, 1-dodecene, 3-methyl-1-butene, 4-methyl-1-pentene, vinylcyclohexane, styrene and the like. Olefins for production of stereoregular polymers have the formula $CH_2=CH-CH_2-R$ where R is an alkyl group, including branched groups.

For some uses, such as the preparation of copolymers employed in the compositions of said application of Holler and Lorensen, the monoolefin hydrocarbons have at least six and up to 50 or more carbon atoms. Monomers such as hexene-1, octadecene-1, heptacontene-1, and the like, are suitable. Most preferred for said copolymers are alpha-monoolefins of from 10 to 30 carbon atoms per molecule.

Halogen-bearing olefins

The halogen-bearing olefins have a single olefinic double bond, i.e., a vinyl group, in terminal position in the molecule, and have one of certain halogen-containing groups separated by at least two carbon atoms from said terminal vinyl group. They may be represented by the general formula $$CH_2=CH-X(Z)_n \quad (1)$$

where X represents a non-reactive group, i.e., a group which is non-reactive under Ziegler polymerization conditions, Z represents a halogen, and $n$ is an integer (excluding $n=0$), provided that the distance separating $$CH_2=CH-$$

and Z is at least equivalent to that provided by an intervening ethylene group and preferably by at least a trimethylene group. When $n$ is 2 or more, the groups Z may be identical to each other or different. Group X is generally free of olefinic or acetylenic unsaturation, although isolated internal unsaturation may be present. For most practical purposes $n=1$ and Formula 1 become $$CH_2=CH-X-Z \quad (2)$$

The non-reactive group X is preferably a polymethylene group $$-(CH_2)_m-$$

wherein $m$ is preferably between 3 and 10. However, useful results can sometimes be obtained when $m=2$, and in some cases when it is greater than 10 and up to 30.

The non-reactive group X may also be a hydrocarbon group other than a polymethylene group, including other aliphatic groups and cyclic (cycloaliphatic and aromatic) groups, and non-reactive organic groups which contain one or more hetero-atoms. For example, X may represent a branched alkyl group, an alkyl group bearing one or more cyclic substituents, a cyclic group, or a cyclic group bearing one or more aliphatic or cyclic substituents. Group X may be polyvalent and may bear more than one polar group Z. Useful groups X may also have one or more carbon atoms replaced by silicon, such as in silicoalkyl groups, e.g., $-CH_2CH_2Si(CH_3)_3CH_2CH_2-$.

The terminal olefins which bear halogen groups and which are suitable for use in this invention accordingly include halogen-substituted normal or branched chain alpha-olefins and halogen-substituted 1-alkenyl alicyclic or aromatic compounds. The halogen substituent or substituents in the 1-alkenyl alicyclic or aromatic monomers may be attached through a side chain on the ring also.

In the above structures halogen should preferably be bound to aromatic carbon atoms or to saturated primary or secondary carbon atoms. Halogens bound to allylic, benzylic, and tertiary carbon atoms are undesirable.

Major groups of polar olefins classified by generic formulas of compounds

The major groups of these compounds are represented by the following generic formulas:

$$H_2C=CH-(CR_2)_a-Z \qquad (I)$$

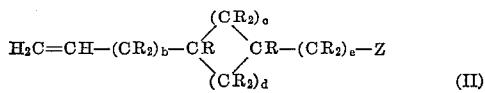

(II)

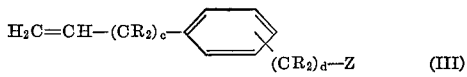

(III)

In these formulas, Z represents a halogen; $a$ is an integer greater than 1 and preferably greater than 2; $b$ and $e$ are integers equal to or greater than 0; $c$ is an integer which may be zero; $d$ is zero or an integer greater than 1; the sum of $c$ and $d$ is greater than 1; and R represents hydrogen alkyl or aryl groups. The only restriction on the latter generalization is that at least one of the substituents on the carbon atom attached to the vinyl group should be hydrogen, because when this atom is triply substituted with groups other than hydrogen the polymerization rate of the olefin is prohibitively slow due to steric hindrance to the vinyl group.

Most preferred for most purposes are Compounds I in which R represents hydrogen and $a$ is an integer from 3 to 18, i.e., omega-Z-substituted 1-alkenes having from 5 to 20 carbon atoms in the alkenyl group.

Representative halogen-bearing compounds

Following are illustrative examples of the halogen-bearing compounds which can be used in this invention:

Class I—

4-chloro-3-cyclopentylbutene-1    C=C—C—C—Cl
5-bromopentene-1    C=C—C—C—C—Br
5-iodohexene-1    C=C—C—C—C—C
                                              |
                                              I 7-chlorooctene-1    C=C—C—C—C—C—C—C
                                                    |
                                                    Cl
7-chloro-5-methylheptene-1    C=C—C—C—C—C—C—Cl
                                                              |
                                                              C 8-chloro-7-phenyloctene-1    C=C—C—C—C—C—C—C—Cl
                                                                  |
                                                                  φ
10-bromoundecene-1    C=C—C—C—C—C—C—C—C—C
                                                                      |
                                                                      Br Class II—

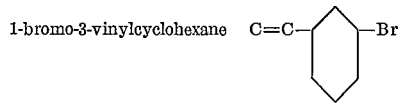

1-allyl-3-chloromethylcyclopentane    C=C—C—[cyclopentane]—CH$_2$Cl 1-bromo-3-vinylcyclohexane    C=C—[cyclohexane]—Br Class III—

1-allyl-3-chlorobenzene    C=C—C—[benzene]—Cl 1-(3-iodopropyl)-3-vinylbenzene    C=C—[benzene]—C—C—C—I

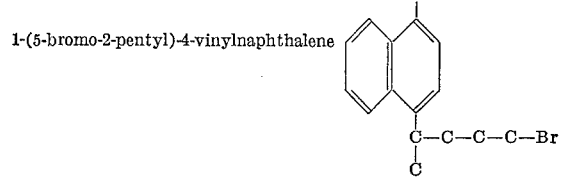

1-(5-bromo-2-pentyl)-4-vinylnaphthalene

The illustrated compounds are familiar to organic chemists. No useful purpose would be served by further multiplying illustrative species.

POLYMERS

The homopolymers of halogen-bearing compounds, produced according to this invention, are produced as substantially linear polymers having, in general, a weight average molecular weight in the range from about 10,000 to a million.

Homopolymers of compounds having a generic formula $CH_2=CH-X-Z_n$ can be represented by $$\sim-CH_2-CH-CH_2-CH-CH_2-CH\sim \qquad (3)$$
$$\phantom{\sim-CH_2-}|\phantom{CH-CH_2-}|\phantom{CH-CH_2-}|$$
$$\phantom{\sim-CH_2-}X(Z)_n\phantom{CH-}X(Z)_n\phantom{CH-}X(Z)_n$$

or by $$-\{CH_2-CH[X(Z)_n]\}_m-$$

where $m$ is at least about 100. The wavy lines in Formula 3 symbolize repetition of the same units. Terminal groups are generally not significant in determining properties of these polymers.

Random copolymers of compounds having the generic formula $CH_2=CH-X(Z)_n$ and an alpha-monoolefin hydrocarbon $CH_2=CHR$, where R is hydrogen or a saturated hydrocarbon group, are typified by the following molecular arrangements, where $a$ is $-CH_2-CH(R)-$ and $b$ is $-CH_2-CH[X(Z)_n]-$:

$$-aabbabbaaaabbab- \qquad (4)$$

represents a polymer in which the proportions of monomers are nearly equal, and $$-aaaaaabaabbaaaaaabbba- \qquad (5)$$

one in which $a$ is present in substantial excess. In such random copolymers, uninterrupted sequences generally comprise from 1 to 100 monomer units.

The proportion of halogen-bearing monomer units *b* relative to hydrocarbon monomer units *a* may vary widely, e.g., from 0.01 to 90 percent by weight, resulting in products which have properties similar to either homopolymer. Often the presence of a relatively small proportion, e.g., from 0.1 to 1 percent or up to 10 percent of the halogen-bearing monomer imparts valuable properties to the polymer, such as dyeability or other reactivity while permitting it to retain to a substantial extent the desired physical properties of the pure olefin homopolymer. Random copolymers with from 0.1 to 1% or from 1 to 10% units of halogen-bearing monomer are thus especially useful for many purposes. For other purposes units of halogen-bearing monomer may be desired in concentrations above 10 percent, e.g., as much as 10 to 30 percent or more, to provide polymers having both modified physical and chemical properties, e.g., fire-retardancy. Random copolymers containing a major proportion by weight of halogen-bearing monomer units are rarely desired.

Block copolymers of this invention can be represented by the following molecular arrangements 6 through 10, wherein $[A_p]$ is a homopolymer sequence of *p* monomer units *a*, $[B_q]$ is a homopolymer sequence of *q* monomer units *b*, and $[A_rB_s]$ is a random copolymer sequence of *r* monomer units *a* and *s* monomer units *b*:

$$[A_p][B_q] \qquad (6)$$

represents the preferred block copolymers of this invention, in which a single block of linear halogen-bearing alpha olefin homopolymer is attached to a single block of linear alpha olefin hydrocarbon homopolymers.

Other block copolymers may be produced by repeatedly forming blocks $[A_p]$ and $[B_q]$ where *p* and *q* may vary. Typical is the polymer $$[A_{p1}][B_{q1}][A_{p2}][B_{q2}][A_{p3}][B_{q3}] \qquad (7)$$

Other block polymers comprise blocks $[A_p]$ and blocks $[A_rB_s]$, such as $$[A_p][A_rB_s] \qquad (8)$$

and $$[A_{p1}][A_{r1}B_{s1}][A_{p2}][A_{r2}B_{s2}][A_{p3}][A_{r3}B_{s3}] \qquad (9)$$

The random copolymer sequences may have the same compositions as described above for random copolymers and the ratio of $r+s$ to *p* may be similar to the ratio of *q* to *p*, defined below. Blocks of different compositions may be connected by a block of random compositions, as in $$[A_p][A_rB_s][B_q] \qquad (10)$$

Such polymers result when a monomer *b* is introduced into a reaction mixture in which polymer $[A_{p1}]$ has been formed, and in which some unreacted monomer *a* is still present.

The proportion of polar monomer in the total block copolymer is preferably in the same range as previously stated for the case of random copolymers. In the block polymers of this invention, the predominant segment usually is $[A_p]$. In polymers of Formulas 6 through 10, the ratios of $p:q$, $\Sigma p:\Sigma q$, $p:(r+s)$, $\Sigma p:\Sigma(r+s)$ and $p:q$ respectively, are preferably between 5:1 and 25:1, but may be as low as 1:1 in some cases and as high as 100:1 in others. In polymers such as 6, 8 and 10, block $[A_p]$ preferably contains at least about 200 molecules and preferably 1000 to 10,000 molecules; in multiblock polymers, such as 7 and 9, the number of molecules per block $[A_{p:}]$ may be from 20 to 200, and up to about 5000.

Variants of the described block copolymers will readily occur to the skilled polymerization chemist, and are within the scope of this invention.

CATALYSTS

A large number of polymerization catalysts based on transition metal compounds have been disclosed. A summary of the state of the art in 1959 with respect to those so-called Ziegler catalysts is found in "Linear and Stereoregular Addition Polymers" by Gaylord et al., Interscience Publishers, Inc., New York. With the qualifications hereafter set out, these catalysts are useful in the process of this invention.

One essential component of Ziegler-type catalyst compositions is the halide or alkoxyhalide of a transition metal selected from Groups 4b, 5b, 6b, and 8 of the Periodic Table of the Elements. In the active catalyst the transition metal is at a valence below its maximum. Among the halogens the order of preference runs from chlorides to bromides to iodides to fluorides.

Titanium trichloride is particularly preferred and especially the gamma form thereof. With a highly effective aluminum alkyl, this leads to the most effective catalysts. An active form of titanium trichloride is prepared by reducing titanium tetrachloride by reaction with an aluminum trialkyl, as described, for example, in U.S. 2,971,925 to Winkler et al. Activated forms of alpha and gamma titanium trichloride are sometimes referred to as delta titanium trichloride. The delta form, as well as the beta form of titanium trichloride, are also suitable for use in the catalysts of this invention. These active forms of titanium trichloride generally may be considered as cocrystalline mixtures of $TiCl_3$ and $AlCl_3$ of varying compositions. Both the $\beta\text{-}TiCl_3$ and $\gamma\text{-}TiCl_3$ can be produced by reacting 1 mol of $TiCl_4$ with ⅓ mol of aluminum triethyl. Brown $\beta\text{-}TiCl_3$ results when the reaction is carried out at relatively low temperature, e.g., 25° C.; purple $\gamma\text{-}TiCl_3$ is produced at a higher temperature, e.g., 160° C. Both the brown and purple forms of $TiCl_3$ and methods for preparing them are well known to persons skilled in this art. Other catalytically active forms of $TiCl_3$ are commercially produced by reduction of $TiCl_4$ by means of aluminum metal, or with hydrogen, followed by an activating treatment.

Other suitable titanium compounds include butoxy titanium dichloride and ethoxy titanium dichloride.

Another preferred catalyst comprises the active form of vanadium trichloride.

Similar compounds of zirconium and other transition metals can be used, such as their trichlorides, tribromides, and alkoxy dichlorides.

The reducing component of the catalyst is an organometallic compound of magnesium, zinc, cadmium, aluminum, gallium or indium, having a metal-to-carbon bond.

Aluminum compounds are preferred. Especially preferred are those having the formula $AlR_3$; also useful but often somewhat inferior are the compounds RR'AlX wherein R is hydrocarbon, R' is selected from the group consisting of hydrogen and hydrocarbon, and X is selected from the group consisting of hydrogen, halogen, alkoxy, aryloxy, the residue of a secondary amine, amide, mercaptan, thiophenol, carboxylic acid and sulfonic acid. Compounds of formula $RAlX_2$ are best employed in combination with RR'AlX; compounds $R_3Al_2X_3$ are also suitable. Suitable cadmium and zinc compounds are those of formula RR'Cd or RR'Zn in which each R is a saturated hydrocarbon group of from 1 to 10 carbon atoms, e.g., an alkyl, cycloalkyl, aryl or alkaryl group. Usually R and R' are identical, but they may be different if desired. Zinc or cadmium diethyl and di-n-propyl are particularly preferred. R and R' may also be isopropyl, isobutyl, isoamyl, phenyl, tolyl, and the like.

Preferred for practical purposes are, among the aluminum alkyl compounds, trialkyls and to a lesser extent dialkyl monohalides, wherein the alkyl groups have from one to ten carbon atoms; zinc dialkyls having alkyl groups from one to ten carbon atoms; and mixtures thereof. Cadmium dialkyls are also of some practical interest. The preferred alkyl group in each type is the ethyl group, but compounds having n-propyl, isopropyl, n-butyl, isobutyl, n-octyl or 2-ethylhexyl groups, etc., may be employed. To produce catalysts which are highly efficient, aluminum trialkyls are preferred; aluminum triisobutyl is most preferred. Instead of alkyl groups, suitable organometallic compounds may also have cycloalkyl, aryl, alkaryl or aralkyl groups.

The catalysts may be prepared by combining the ingredients in any desired order and contacting the combined ingredients with the monomer to be polymerized. In a batch or semi-batch method the catalyst ingredients are placed into a suitable hydrocarbon diluent in the reactor and monomer feed is then introduced. Additional catalyst components may be added during the course of the reaction. In continuous processes catalyst ingredients may be fed separately or in combination to the reactor as required during the course of the process.

In order to prevent unwanted cationic olefin polymerization, it is often desirable to include in the catalyst mixture a basic polar additive. Amines are preferred additives, though phosphines, ethers, sulfides and other compounds containing Group Va and VIa atoms are serviceable. Variable molar ratios of polar additives to catalyst components are useable. In general, however, about one mole of polar additive to each 2 or 3 of metal alkyl cocatalyst serves well.

Although useful results are obtained with primary amines, such as ethyl amine or 2-ethylhexylamine, and with secondary amines, such as diethylamine or diamylamine, the preferred amines are tertiary amines such as triethylamine, triisoamylamine, and so forth. The same is true of the corresponding phosphines. Among the ethers and sulfides, the unbranched dialkylethers and dialkyl sulfides are preferred. The skilled chemist will know how to make an appropriate selection from such compounds, preferring those that have appropriate physical properties, such as being liquids at reaction temperature, and appropriate chemical properties, such as being not excessively sterically hindered and being free of olefinic unsaturation.

POLYMERIZATION METHODS AND CONDITIONS

Polymerizations according to this invention and recovery of polymer are suitably carried out according to methods known to be suitable for low-pressure olefin polymerization processes of the prior art. This includes batchwise, semi-batchwise or continuous operations under conditions that exclude air and other atmospheric impurities, particularly moisture.

The reaction temperature is maintained between 0° and 150° C. Temperatures between 0° and 60° C. are generally preferred.

The reaction pressure is not critical. It is usually only sufficiently high to maintain liquid phase reaction conditions; it may be autogenic pressure, which will vary depending upon the components of the reaction mixture and the temperature, or it may be higher, e.g., up to 1000 p.s.i. High pressures are suitably obtained by pressuring with monomer gas or with an inert gas.

In batch operations the polymerization time can be varied as desired; it may vary, for example, from a few minutes to several hours. Polymerization in batch processes may be terminated when monomer is no longer absorbed, or earlier, if desired, e.g., if the reaction mixture becomes too viscous. In continuous operations the polymerization mixture passes through a reactor of any suitable design. The polymerization reactions in such cases are suitably adjusted by varying the residence time. Residence times vary with the type of reactor system and range, for example, from 10 to 15 minutes to 2 or more hours.

In a suitable continuous operation, fresh feed, diluent and catalyst are continuously introduced into an agitated reaction zone and reaction mixture is withdrawn from the zone for removal and recovery of polymer. Heat of reaction may be withdrawn by indirect heat exchange or by evaporation of diluent and/or monomer in the reaction zone.

After the polymerization is complete, polymer is recovered from a slurry or solution of the polymer in reaction diluent. A simple filtration may be adequate to separate polymer from diluent. Other means for separating polymer from diluent may be employed. The polymer may be treated, separately or while slurried in the reaction mixture, in order to separate catalyst residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% w. hydrochloric acid. Following this initial coagulation the polymers are preferably washed several more times in methanol.

The concentration of monomer in the reaction mixture may vary upward from 5 percent by weight of the reaction mixture, depending on the conditions employed; the range from 20 to 80 percent by weight is preferred.

Catalysts are suitably used in a concentration ranging from about 0.1 to about 2% by weight based on the weight of the reaction mixture. The preferred molar ratios of organometallic reducing compound to transition metal halide or alkoxyhalide are in the range from 1:1 to 3:1, but ratios as low as 0.5:1 or as high as 30:1, may be employed. The higher ratios may be required for polymerization in which appreciable amounts of amines of similar additives are employed to suppress cationic polymerizations. In general, the amount of organometallic reducing compound is sufficient to provide an excess of at least about 1 mole per mole of transition metal halide or alkoxide over the amount which is consumed in complexing with compounds which suppress cationic polymerization. The proportion of the latter compounds is in the range from 0 to 0.5 mole per mole of organometallic reducing compound.

It is preferred to carry out the reactions according to this invention in a suitable diluent which is liquid under the conditions of reaction and relatively inert. The diluent may have the same number of carbon atoms per molecule as the olefin reactant or it may be in a different boiling range. Preferred as diluents are alkane and cycloalkane hydrocarbons. Suitable diluents are, for example, propane, butane, isobutane, cyclohexane, methylcyclohexane, Tetralin, Decalin, or saturated hydrocarbon mixtures in the gasoline boiling range or diesel oil boiling range. Aromatic hydrocarbons such as benzene, toluene, isopropylbenzene, xylene, or the like, or halogenated aromatic compounds such as chlorobenzene, or orthodichlorobenzene and the like may also be employed, if desired.

ILLUSTRATIVE EXAMPLES

The following examples are representative of this invention but are not to be considered as limiting it.

Unless otherwise indicated, parts and percentages are by weight.

Unless otherwise indicated, the transition metal component of the catalyst is a composition prepared by admixing titanium tetrachloride and aluminum triethyl in a hydrocarbon solvent in 3:1 molar ratio at ambient temperature, followed by heating at a temperature of 160° to 170° C. for about one half hour. The composition contains $TiCl_3$ in its active gamma form.

Unless otherwise stated, the experiments are carried out as follows: Reaction mixture, including solvent, monomers and catalyst, is prepared in a pressure resistant glass bottle in the absence of air and moisture. The bottle is closed and agitated in a controlled temperature bath for the desired period. At the end of the period, acidified isopropanol is added to deactivate the catalyst. The product is then precipitated and washed free of acid with methanol. Studies may then be carried out on the polymer.

EXAMPLES 1–9

Representative experimental results of representative homopolymerizations and copolymerizations are reported in tabular form in Table 1.

TABLE 1

| Ex. No. | Olefin(s), gms. | Catalyst Components, mmole TiCl₃ | Catalyst Components, mmole Metal Alkyl | Catalyst Components, mmole Additive | Solvent, ml. | Polymerization Conditions Time In Days | Polymerization Conditions Temp, °C. | Polymer Yield, gms. | Elemental Analysis, percent w. Found | Elemental Analysis, percent w. Theory | Polymer Appearance and Properties |
|---|---|---|---|---|---|---|---|---|---|---|---|
| 1 | CH₂=CH(CH₂)₂Br, 11.7 | 0.5 | 3.0 AliBu₃ | | 60 φ-Cl | 20 | 20 | 8.7 | 34.0 Br | 34.27 Br | Intrinsic viscosity in 50° toluene=2.4 dl./g.; soft clear nearly colorless rubber. |
| 2 | {CH₂=CH(CH₂)₂Br, 11.7; 4-methyl-1-pentene 20.0} | 0.5 | 2.0 AlEt₂Cl | | 60 n-C₇ | 7 | 50 | 21.6 | 5.8 Br | | Intrinsic viscosity in 150° Decalin=4.6 dl./g.; tough horny polymer. |
| 3 | CF₂=CCl₂—CH₂—CH—CH=CH₂, 30.0 | 1.0 | 6.0 AliBu₃ | | 60 n-C₇ | 20 | 20 | 0.4 | 42.8 C; 3.9 H; 18.4 F; 34.6 Cl | 38.53 C; 3.23 H; 20.32 F; 37.92 Cl | White powder; birefringment melting point 190° C. |
| 4 | CF₂—CCl₂—CH₂—CH—CH=CH₂, 30.0 | 0.5 | 3.0 AlEt₃ | 1.0 nBu₃N | 30 n-C₇ | 7 | 50 | 0.6 | 43.5 C; 4.1 H; 19.8 F; 32.1 Cl | See above | Fairly yellow powder; birefringment melting point=190° C. |
| 5 | CF₂—CFClCH₂CH—CH=CH₂, 12.5 | 0.5 | 3.0 AlEt₃ | 1.0 nBu₃N | 30 n-C₇ | 7 | 50 | 0.15 | 9.0 F; 5.0 Cl | | Slightly tan powder; birefringment melting point=130° C.; infrared indicates this to be an ethylene copolymer; moderately crystalline by X-ray but d-spacing does not match polyethylene. |
| 6 | CF₂CFClCH₂CH(CH₂)CH=CH₂, 20.1 | 1.0 | 4.0 AliBu₃ | | 60 φ-Cl | 7 | 50 | 5.5 | 48.6 C; 5.2 H; 34.0 F; 17.85 Cl | 48.37 C; 5.08 H; 28.70 F; 17.85 Cl | White powder which presses to slightly hazy colorless films with density=1.36 g/mL; birefringment melting points near 235° C. and 285° C. probably due to two crystalline modifications. |
| 7 | CF₂—CFClCH₂CH(CH₃)CH=CH₂, 11.7 | 0.5 | 3.0 AlEt₃ | 1.0 nBu₃N | 30 n-C₇ | 7 | 50 | 2.0 | 47.9 C; 5.2 H; 29.7 F; 17.1 Cl | See above | White powder which presses to clear sheets; birefringment melting point 238° C. |
| 8 | {CF₂—CFClCH₂CH(CH₂)CH=CH₂, 10.2; 1-dodecene, 11.0} | 1.0 | 4.0 AliBu₃ | | 20 φ-Cl | 7 | 50 | 19.1 | 17.6 F | | Amber rubbery polymer; birefringment M.P.=43–44° C. |
| 9 | F,F-C₆F₄-CH=CH₂, 15.3 | 1.0 | 6.0 AlMe₃ | | 20 n-C₇ | 20 | 20 | 0.1 | 51.7 C; 2.8 H; 45.0 F | 51.94 C; 2.42 H; 45.6 F | White powder; slightly crystalline by X-ray; birefringmentmelting point 390° C. |

EXAMPLES 10–15

In Table 2 are listed further examples illustrating the results that can be expected when the invention is carried out with other halogen-substituted monomers under conditions similar to those of Examples 4 and 5.

TABLE 2

| Run No. | Olefin(s), gms. | Catalyst, mmole TiCl₃ | Catalyst, mmole Metal Alkyl | Additive | Solvent, ml. | Polymerization Conditions Time, Days | Polymerization Conditions Temp, °C. | Polymer Yield, gms. | Elemental Analysis Percent w. Found | Elemental Analysis Percent w. Theory | Polymer appearance and Properties |
|---|---|---|---|---|---|---|---|---|---|---|---|
| 10 | 5-bromo-1-pentene, 20.7 | 1.0 | 4.0 EtAl | 1.0 pyridine | 60 ml. φ-Cl | 7 | 30 | 15.4 | 52.4 Br | 53.62 | Pale yellow stiff rubber. |
| 11 | 5-bromo-1-pentene, 3.0; 1-hexene, 16.8 | 1.0 | 4.0 EtAl | do | 60 ml. φ-Cl | 7 | 30 | 17.9 | 6.7 Br | | Nearly colorless amorphous solid. |
| 12 | 7-chlorooctene-1, 14.7 | 1.0 | 4.0 AliBu₃ | 1.0 Et₃N | 60 ml. n-C₇ | 20 | 0 | 0.6 | 23.5 Cl | 24.18 | Colorless amorphous solid. |
| 13 | 5-iodohexene-1, 4.2 | 0.5 | 4.0 AliBu₃ | 1.0 n-Bu₃N | 60 ml. n-C₇ | 20 | 0 | 2.6 | 57.0 I | 60.41 | Orange-brown soft rubber. |
| 14 | Mixture of 1-bromo-3-vinyl-cyclohexane and 1-bromo-4-vinyl-cyclohexane, 19.0 | 2.0 | 8.0 EtAlCl₂ | 2.0 pyridine | 60 ml. φ-Cl | 20 | 20 | 1.2 | 40.6 Br | 42.04 | White solid, slightly crystalline. |
| 15 | 1-allyl-3-chlorobenzene, 15.3 | 1.0 | 3.0 EtAlCl | | 60 ml. n-C₇ | 7 | 50 | 3.1 | 23.1 | 23.23 | White amorphous solid. |

EXAMPLES 16–19

Block polymerizations of alpha-monoolefins and halogen-bearing olefins is suitably carried out as follows, the results and some of the conditions being listed in Table 3.

Into 600 ml. of n-heptane in a pressure vessel are introduced 5 millimoles of TiCl₃ prepared as described under the heading "Illustrative Examples," and 20 millimoles of diethyl aluminum monochloride cocatalyst. The mixture is stirred and maintained at 50°±3° C. Propylene is then continuously introduced at a rate sufficient to maintain a pressure of 5 p.s.i.g. After one hour, flow of propylene is discontinued and a halogen-bearing monomer added to the reaction mixture. Further aluminum trialkyl or aluminum alkyl halide and amine, or other basic agent to supress cationic polymerization may be added at the same time as the halogenated monomer in order to maintain polymerization conditions if required. The tailblocking polymerizations are continued following the formation of the propylene block, as specified above, in the manner given in Table 3.

TABLE 3.—BLOCK COPOLYMERIZATION OF PROPYLENE AND HALOGENATED OLEFINS

| Example No. | Halogen-bearing Monomer, gms. | Additives Used in Second Stage, mmoles | Polymerization Conditions | | Halogenated Olefin Conv. to Polymer percent w. | IV in 150° decane, dl./g. | Percent w. Insol. in Isooctane |
| | | | Time, Days | Temp., °C. | | | |
|---|---|---|---|---|---|---|---|
| 16 | 7-chlorooctene-1, 14.7 | Tri-n-butylamine, 5.0 | 2 | 50 | 39 | 4.9 | 87 |
| 17 | 11-bromoundecene-1, 23.3 | Tri-n-hexylamine, 8.0 | 2 | 50 | 22 | 5.3 | 75 |
| 18 | Bromo-3 and -4-vinylcyclohexanes, 19.0 | Pyridine, 6.7 | 5 | 50 | 8 | 6.3 | 97 |
| 19 | 3-chloroalkylbenzene, 15.0 | None | 5 | 50 | 10 | 5.7 | 93 |

DEFINITIONS

In order to simplify the language of the claims herein, the term "an inert group X as defined in the specification" is defined as "a group which is non-reactive under conditions of Ziegler polymerization and which separates the groups CH₂=CH— and —Z which are attached to it by a distance at least equivalent to two carbon atoms."

The term "saturated hydrocarbon group" refers to groups free of olefinic and acetylenic unsaturation, but includes aromatic groups, i.e., aryl, alkaryl and aralkyl groups.

We claim as our invention:

1. Linear homopolymer of a substituted olefin of the formula $CH_2=CH-X(Z)_n$ wherein X is a group which is non-reactive under conditions of Ziegler polymerization and which separates the groups CH₂=CH— and —Z which are attached to it, by a distance at least equivalent to two chain carbon atoms, Z is a halogen bound to an aromatic carbon atom or a saturated primary or secondary carbon atom, and $n$ is an integer of at least 1, said polymer having a weight average molecular weight of at least 10,000.

2. Linear homopolymer of 1-chloro-1-octene.

3. Linear homopolymer of 11-bromo-1-undecene.

4. The method of polymerizing an olefin of the formula $CH_2=CH-X(Z)_n$ wherein X is a group which is non-reactive under conditions of Ziegler polymerization and which separates the groups CH₂=CH— and —Z, which are attached to it, by a distance at least equivalent to two chain carbon atoms, Z is a halogen bound to an aromatic carbon atom or a saturated primary or secondary carbon atom, and $n$ is an integer of at least 1, to a linear polymer having a weight average molecular weight of at least 10,000, which comprises contacting a reaction mixture containing said olefin as sole polymerizable monomer with a Ziegler polymerization catalyst consisting essentially of titanium trichloride and an aluminum trialkyl compound.

5. The method of producing a linear homopolymer of 11-bromo-1 undecene which comprises contacting a reaction mixture containing said olefin as sole polymerizable monomer in the presence of an inert liquid halogenated aromatic hydrocarbon with a catalyst consisting essentially of about 0.1 to 5.0 moles of titanium trichloride, and about 0.1 to 15 moles of aluminum trialkyl per 100 moles of said olefin.

6. The method according to claim 4 wherein said reaction mixture contains a sufficient amount of a tertiary amine of phosphine to suppress cationic olefin polymerization during the course of the reaction.

References Cited

UNITED STATES PATENTS 3,222,330  12/1965  Nyce _____ 260—87.5
3,311,600  3/1967  Bacski _____ 260—87.5

FOREIGN PATENTS 1,339,010  8/1963  France.

JOSEPH L. SCHOFER, Primary Examiner
J. A. DONAHUE, JR., Assistant Examiner

U.S. Cl. X.R.
260—87.5, 878